United States Patent
Yang (10) Patent No.: US 7,548,282 B2
(45) Date of Patent: Jun. 16, 2009

(54) DISPLAY SUBSTRATE, METHOD OF MANUFACTURING THE SAME AND DISPLAY DEVICE HAVING THE SAME

(75) Inventor: Yong-Ho Yang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 395 days.

(21) Appl. No.: 11/479,629

(22) Filed: Jun. 30, 2006

(65) Prior Publication Data

US 2007/0001597 A1 Jan. 4, 2007

(30) Foreign Application Priority Data

Jun. 30, 2005 (KR) .................. 10-2005-0058314

(51) Int. Cl.
*G02F 1/1343* (2006.01)
*G02F 1/1345* (2006.01)

(52) U.S. Cl. .................... 349/38; 349/147; 349/149

(58) Field of Classification Search ............ 349/38, 349/149, 147
See application file for complete search history.

(56) References Cited

U.S. PATENT DOCUMENTS 6,219,118 B1* 4/2001 Zhang .................. 349/110
6,818,923 B2* 11/2004 Kim et al. ................. 257/72

* cited by examiner

*Primary Examiner*—Jerry T Rahll
(74) *Attorney, Agent, or Firm*—Haynes and Boone, LLP (57) ABSTRACT

A display substrate includes a substrate, a first capacitor electrode, a dielectric layer, a second capacitor electrode, and a transparent conductive electrode. The substrate includes an effective display region and a non-effective display region that surrounds the effective display region. The first capacitor electrode is in the non-effective display region. The dielectric layer is on the first capacitor electrode. The second capacitor electrode is on the dielectric layer corresponding to the first capacitor electrode. The transparent conductive electrode is positioned substantially in the effective display region. Therefore, the number of elements is decreased so that a size and a manufacturing cost of a display device are reduced.

16 Claims, 10 Drawing Sheets

DISPLAY SUBSTRATE, METHOD OF MANUFACTURING THE SAME AND DISPLAY DEVICE HAVING THE SAME

CROSS REFERENCE OF RELATED APPLICATION

The present application claims priority from Korean Patent Application No. 2005-58314, filed on Jun. 30, 2005, the disclosure of which is hereby incorporated herein by reference in its entirety.

BACKGROUND OF THE INVENTION

1. Field of the Invention

The present invention relates to a display substrate, a method of manufacturing the display substrate, and a display device having the display substrate. More particularly, the present invention relates to a display substrate capable of decreasing the number of elements, a method of manufacturing the display substrate and a display device having the display substrate.

2. Description of the Related Art

A display device such as a liquid crystal display (LCD) device, an organic light emitting display (OLED) device, etc., in general, includes a display panel for displaying an image and a circuit board for applying driving signals to the display panel.

The circuit board changes externally provided image signals into driving signals, which are applied to the display panel through the circuit board. The circuit board includes a flexible printed circuit (FPC) that has a plurality of elements such as a driving integrated circuit (IC), a plurality of capacitors, etc. When a number of elements are integrated on the circuit board, the size of the circuit board is increased, and its structure is relatively complex.

SUMMARY OF THE INVENTION

The present invention provides a display substrate capable of decreasing the number of elements.

The present invention also provides a method of manufacturing the above display substrate.

The present invention also provides a display device having the above display substrate.

A display substrate in accordance with one embodiment of the present invention includes a substrate, a first capacitor electrode, a dielectric layer, a second capacitor electrode and a transparent conductive electrode. The substrate includes an effective display region and a non-effective display region that surrounds the effective display region. The first capacitor electrode is in the non-effective display region. The dielectric layer is on the first capacitor electrode. The second capacitor electrode is on the dielectric layer corresponding to the first capacitor electrode. The transparent conductive electrode is positioned substantially in the effective display region.

A method of manufacturing a display substrate in accordance with one embodiment of the present invention is provided as follows. A metal thin film is formed on a substrate having an effective display region and a non-effective display region. The metal thin film is patterned to form a first capacitor pattern in the non-effective display region. A dielectric layer is formed on the substrate having the first capacitor. A transparent conductive thin film is formed on the dielectric layer. The transparent conductive thin film is patterned to form a second capacitor electrode on the dielectric layer corresponding to the first capacitor electrode in the non-effective display region, and a transparent electrode in the effective display region.

A display device includes a first display substrate, a second display substrate, a liquid crystal layer and a circuit board. The first display substrate includes a substrate, a first capacitor electrode, a dielectric layer, a second capacitor electrode and a transparent conductive electrode. The substrate includes an effective display region and a non-effective display region that surrounds the effective display region. The first capacitor electrode is in the non-effective display region. The dielectric layer is on the first capacitor electrode. The second capacitor electrode is on the dielectric layer corresponding to the first capacitor electrode. The transparent conductive electrode is positioned substantially in the effective display region. The second display substrate includes a transparent substrate, a plurality of pixels, a first signal line, a second signal line, and a plurality of third signal lines. The transparent substrate corresponds to the substrate. The pixels are on the transparent substrate, and correspond to the transparent conductive electrode. The first signal line is electrically connected to the transparent conductive electrode. The second signal line is electrically connected to the second capacitor electrode. The third signal lines are electrically connected to associated pixels. The liquid crystal layer is interposed between the first and second display substrates. The circuit board is electrically connected to the first, second, and third signal lines.

According to embodiments of the present invention, the capacitor for the circuit board is formed on the display substrate. Electric charge may thus be charged or discharged in the capacitor, thereby decreasing the number of the elements of the circuit board. Therefore, the size of the display device is decreased, and a manufacturing cost of the display device is reduced.

BRIEF DESCRIPTION OF THE DRAWINGS

The above and other advantages of the present invention will become more apparent by describing in detail exemplary embodiments thereof with reference to the accompanying drawings, in which.

DESCRIPTION OF THE EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully describe the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Use of the term "first" does not imply that a "second" or other additional element is required.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device, and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
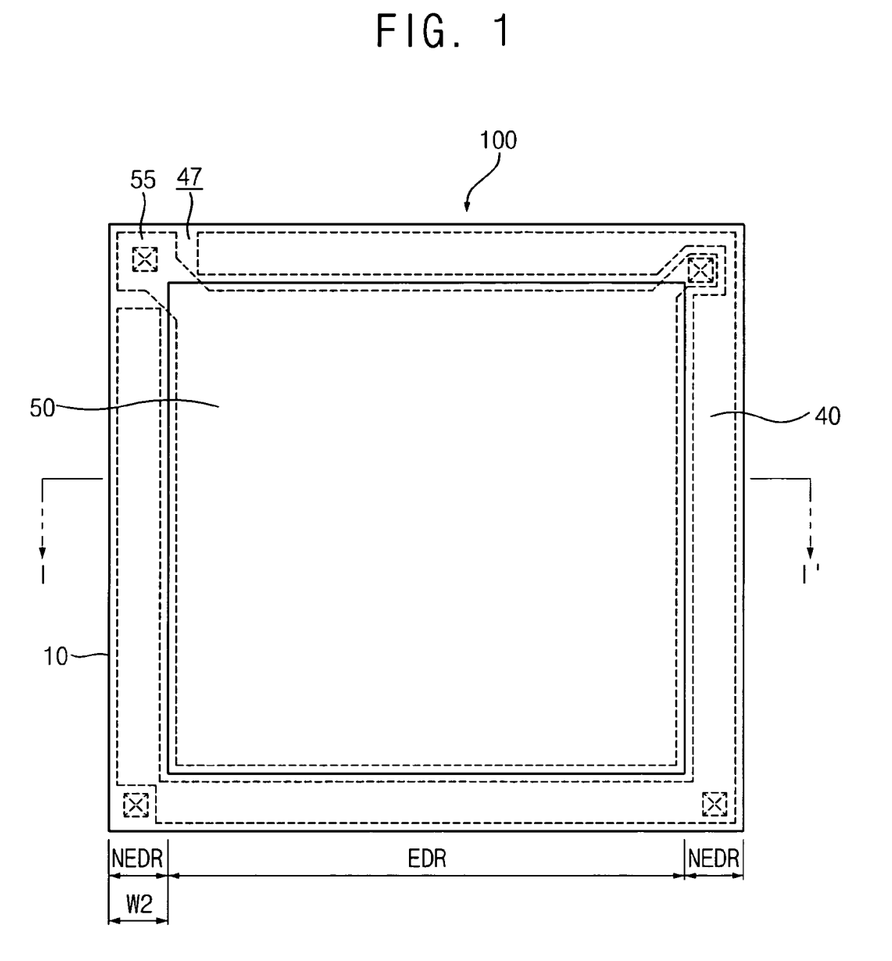
FIG. 1 is a plan view showing a display substrate in accordance with one embodiment of the present invention.
Figure 2:
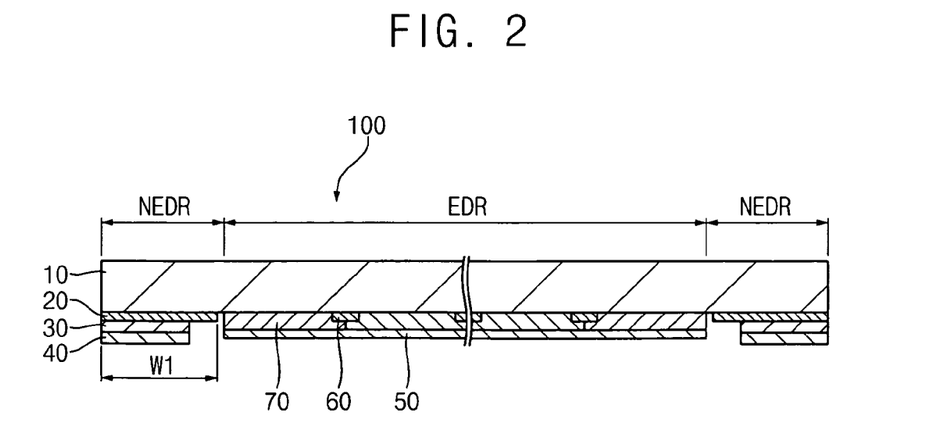
FIG. 2 is a cross-sectional view taken along a line I-I' shown in FIG. 1.

FIG. 1 is a plan view showing a display substrate in accordance with one embodiment of the present invention. FIG. 2 is a cross-sectional view taken along a line I-I' shown in FIG. 1.

Referring to FIGS. 1 and 2, the display substrate 100 includes a substrate 10, a first capacitor electrode 20, a dielectric layer 30, a second capacitor electrode 40 and a transparent electrode 50.

For example, the substrate 10 includes a transparent glass substrate. The substrate 10 may have a substantially quadrangular shape when viewed on a plane.

The substrate 10 includes an effective display region EDR and a non-effective display region NEDR. For example, the non-effective display region NEDR may correspond to a peripheral portion of the substrate 10, and may have a band shape. In FIGS. 1 and 2, the non-effective display region NEDR of substrate 10 is positioned on the peripheral region of the substrate 10 and has a closed loop shape. The non-effective display region NEDR surrounds the effective display region EDR.

The first capacitor electrode 20 is on the substrate 10. The dielectric layer 30 is on the first capacitor electrode 20. The second capacitor electrode 40 is on the dielectric layer 30. The first capacitor electrode 20, the dielectric layer 30 and the second capacitor electrode 40 form a capacitor, and an electric charge is stored in the capacitor.

The first capacitor electrode 20 is in the non-effective display region NEDR of the substrate 10. For example, the first capacitor electrode 20 may be positioned along the non-effective display region NEDR A width W1 of the first capacitor electrode 20 may be substantially same as a width W2 of the non-effective display region NEDR.

The first capacitor electrode 20 may have a closed loop shape that is substantially the same as the non-effective display region NEDR. The first capacitor electrode 20 may be formed using a material including a metal. Examples of metals that may be used for the first capacitor electrode 20 include chromium, chromium oxide, etc.

The dielectric layer 30 is on the first capacitor electrode 20. The dielectric layer 30 may include a dielectric material. Examples of dielectric materials that may be used for the dielectric layer 30 include silicon oxide, silicon nitride, organic materials, etc. The dielectric layer 30 functions as a dielectric material to store the electric charge applied through the first and second capacitor electrodes 20 and 40.

The second capacitor electrode 40 is on the dielectric layer 30. The second capacitor electrode 40 may include a transparent conductive material. Examples of transparent conductive material that may be used for the second capacitor electrode 40 include indium tin oxide (ITO), indium zinc oxide (IZO), amorphous indium tin oxide (a-ITO), etc.

The transparent electrode 50 may be positioned substantially in the effective display region EDR. That is, most of transparent electrode 50 may be positioned in the effective display region EDR, while one or more portions of transparent electrode 50 may extend into the non-effective display region NEDR, as shown in FIG. 1. The transparent electrode 50 may include transparent conductive material. Examples of transparent conductive material that, may be used for the transparent electrode 50 include indium tin oxide (ITO), indium zinc oxide (IZO), amorphous indium tin oxide (a-ITO), etc.

In operation, a driving signal for displaying an image is applied to the transparent electrode 50. A charging signal or a discharging signal is applied to the second capacitor electrode 40. The transparent electrode 50 is spaced apart from the second capacitor electrode 40.

The driving signal may be applied to the transparent electrode 50 through a conductive connector (not shown). However, when the conductive connector (not shown) is formed in the effective display region EDR, the opening ratio and luminance may be decreased. The image display quality of the display substrate may thus be compromised.

In the embodiment illustrated in FIGS. 1 and 2, however, the transparent electrode 50 includes a protruded portion 55 that protrudes from the effective display region EDR into the non-effective display region NEDR. The second capacitor electrode 40 that corresponds to the protruded portion 55 may include a recessed portion 47 that is spaced apart from the protruded portion 55 when viewed on a plane.

That is, the transparent electrode 50 includes the protruded portion 55 that is protruded from the effective display region EDR into the non-effective display region NEDR, and the second capacitor electrode 40 includes a recessed portion 47 that does not overlap with the protruded portion 55.

A black matrix 60 and a color filter 70 may also be formed in the effective display region EDR of the display substrate 100.

The black matrix 60 is formed in the effective display region in a lattice shape. The black matrix 60 includes an opaque material. Examples of opaque materials that can be used for the black matrix 60 include chromium, chromium oxide, etc.

The black matrix 60 is formed on substantially the same layer as the first capacitor electrode 20. In FIGS. 1 and 2, the charging and discharging signals are applied to the first capacitor electrode 20, and the black matrix 60 is spaced apart from the first capacitor electrode 20.

The color filter 70 is formed on the effective display region EDR of the substrate 10 that is exposed through openings of the black matrix 60. For example, the color filter 70 may include a red color filter, a green color filter, and a blue color filter.

Figure 3:
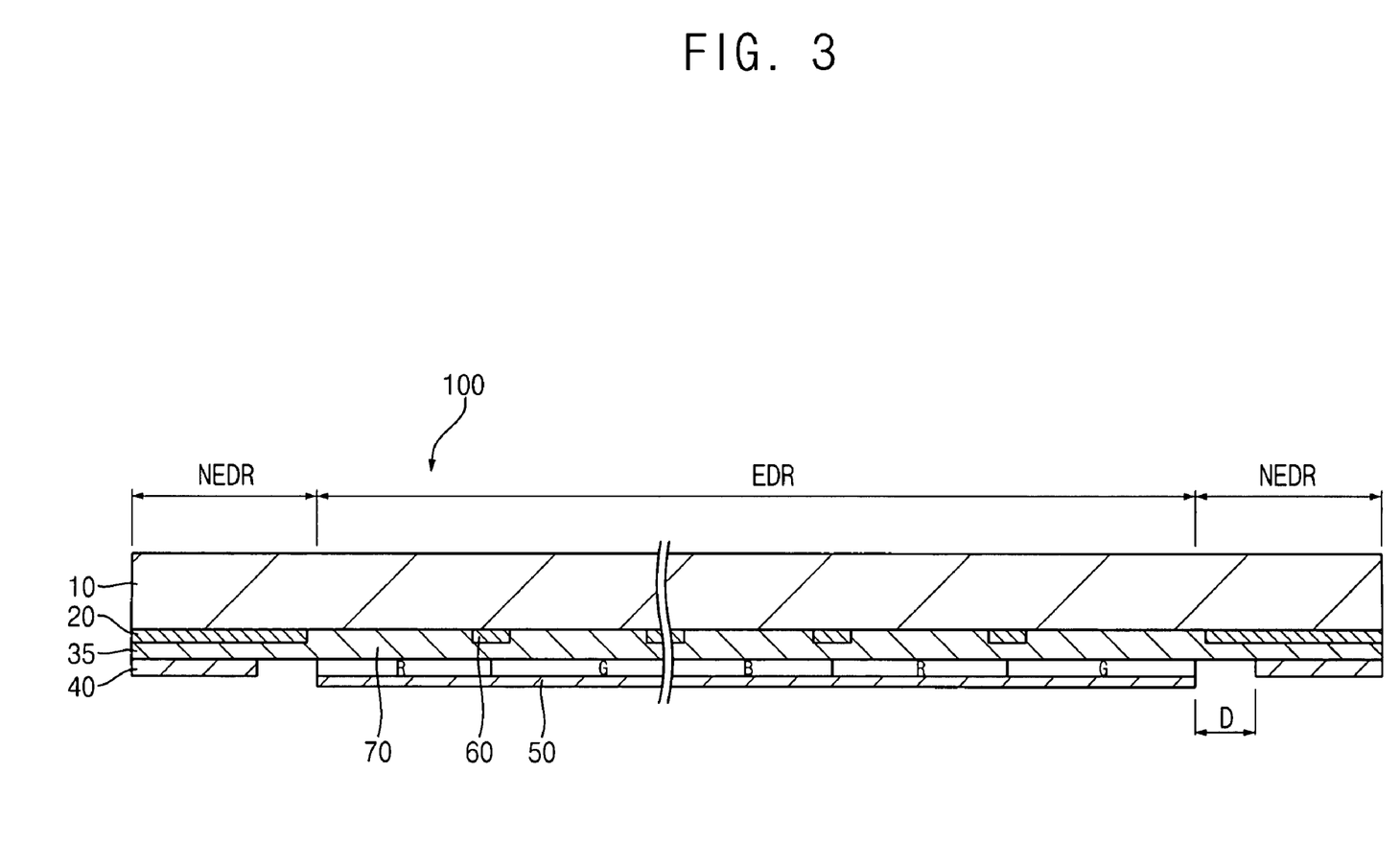
FIG. 3 is a cross-sectional view showing a display substrate in accordance with another embodiment of the present invention.

FIG. 3 is a cross-sectional view showing a display substrate in accordance with another embodiment of the present invention. The display substrate of FIG. 3 is same as in FIGS. 1 and 2, except for dielectric layer 35. Thus, the same reference numerals will be used to refer to the same or like parts as those described in FIGS. 1 to 2 and further explanation may be omitted.

Referring to FIG. 3, the dielectric layer 35 is formed in an effective display region EDR and a non-effective display region NEDR, and the dielectric layer 35 covers the first capacitor electrode 20. The dielectric layer 35 may be formed using a spin coating method. The dielectric layer 35 includes a dielectric material. Examples of dielectric materials that can be used for the dielectric layer 35 include silicon oxide, silicon nitride, etc. A color filter 70 is positioned on the dielectric layer 35, and a transparent electrode 50 is positioned on the color filter 70.

Figure 4:
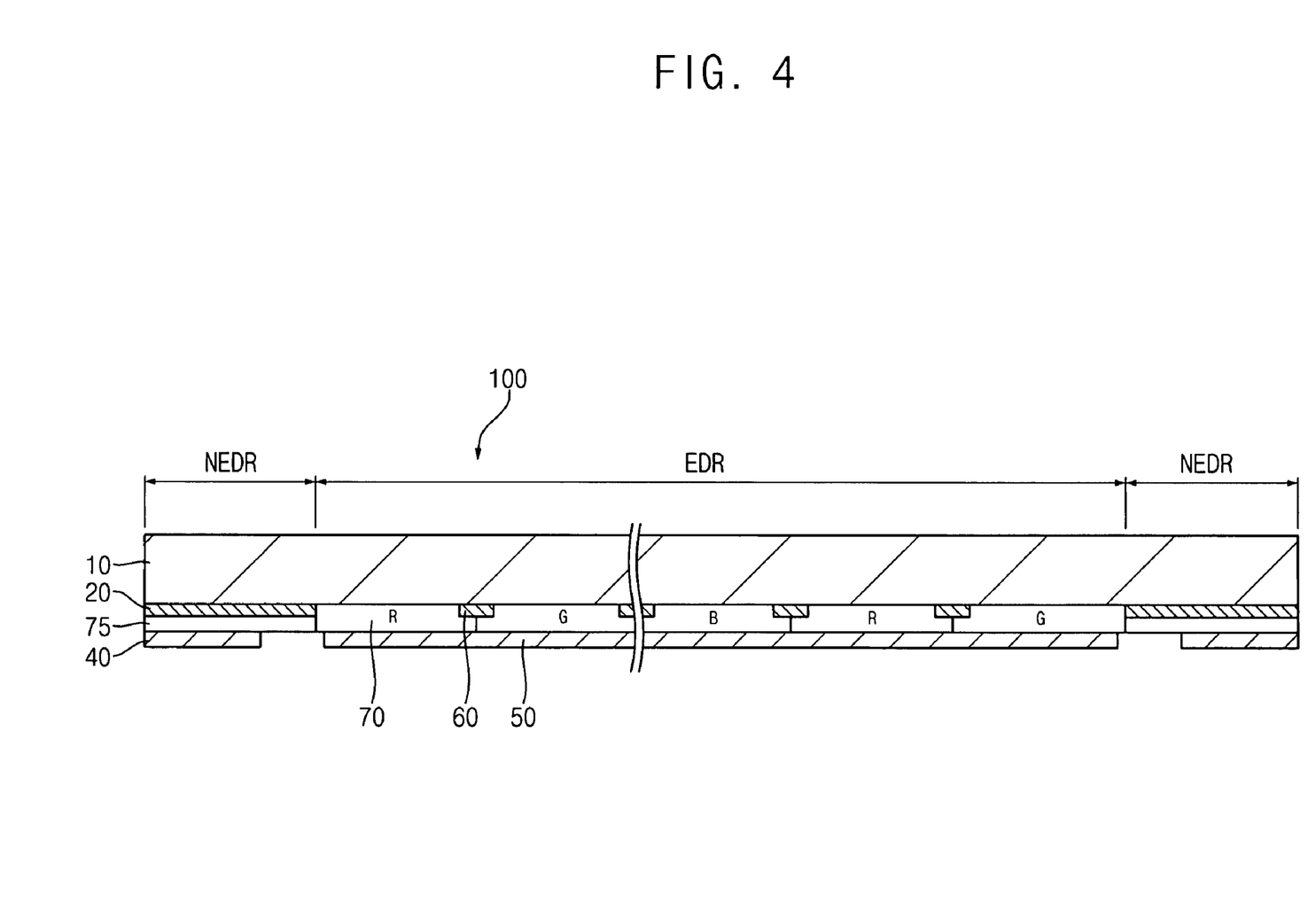
FIG. 4 is a cross-sectional view showing a display substrate in accordance with another embodiment of the present invention.

FIG. 4 is a cross-sectional view showing a display substrate in accordance with another embodiment of the present invention. The display substrate of FIG. 4 is same as in FIGS. 1 and 2 except for dielectric layer 75. Thus, the same reference numerals will be used to refer to the same or like parts as those described in FIGS. 1 to 2 and any further explanations will be omitted.

Referring to FIG. 4, the dielectric layer 75 is in a non-effective display region NEDR between the first and second capacitor electrodes 20 and 40. The dielectric layer 75 may be formed through a process of manufacturing a color filter 70. That is, the dielectric layer 75 includes same material as that of the color filter 70. Since the a material of color filter 70 functions as the dielectric layer 75, an additional material for the dielectric layer 75 need not be provided, so that the structure of display substrate 100 is simplified.

Method of Manufacturing Display Substrate

Figure 5:
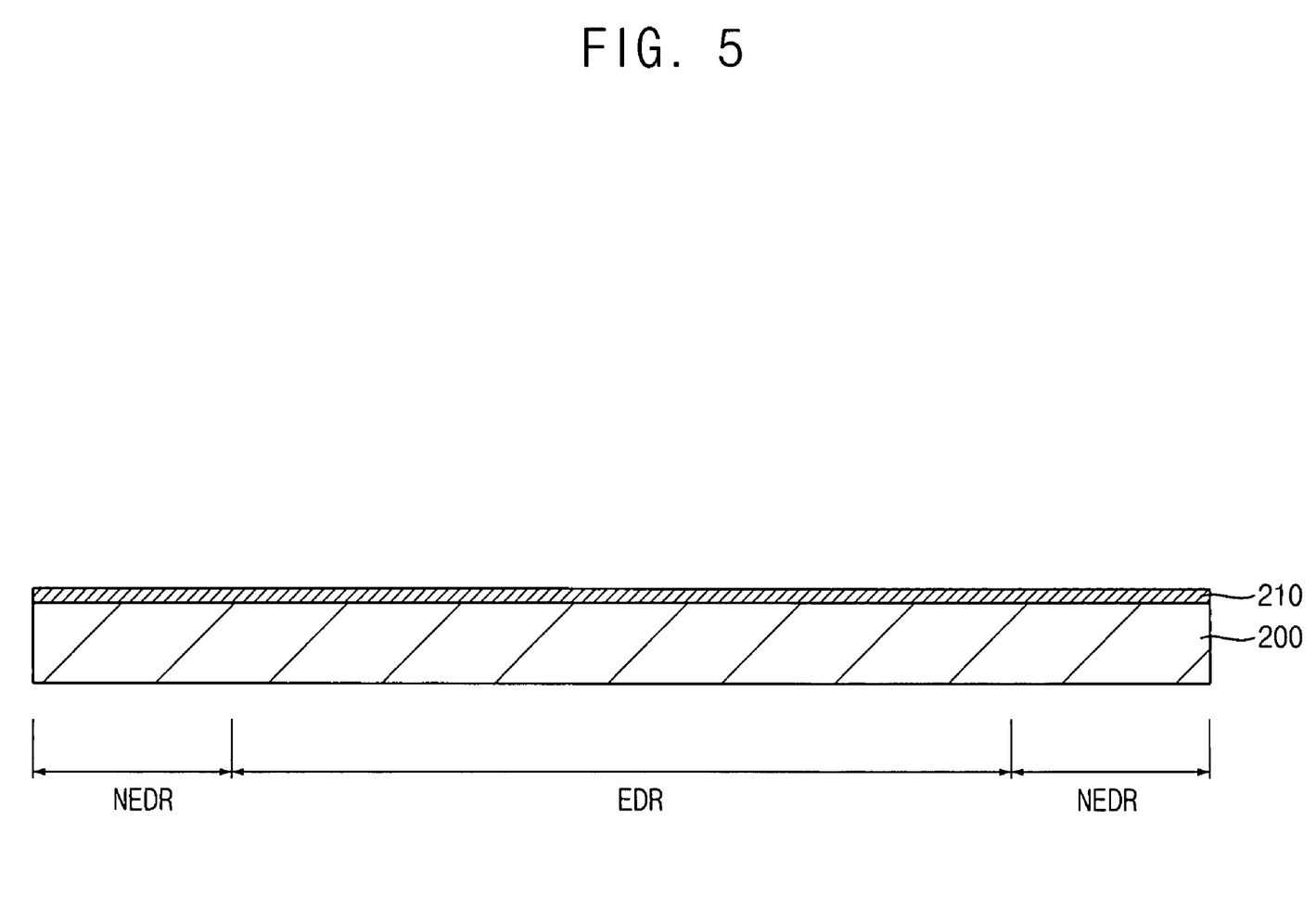
FIG. 5 is a cross-sectional view showing a method of manufacturing a display substrate in accordance with one embodiment of the present invention.

FIG. 5 is a cross-sectional view showing a method of manufacturing a display substrate in accordance with one embodiment of the present invention.

Referring to FIG. 5, an effective display region EDR and a non-effective display region NEDR that surrounds the effective display region EDR are indicated for a substrate 200. The substrate 200 may be a transparent glass substrate.

A metal layer 210 is deposited on the substrate 200 using a sputtering process or a chemical vapor deposition process (or other process). Examples of metals that can be used for the metal layer 210 include chromium, chromium oxide, etc.

Figure 6:
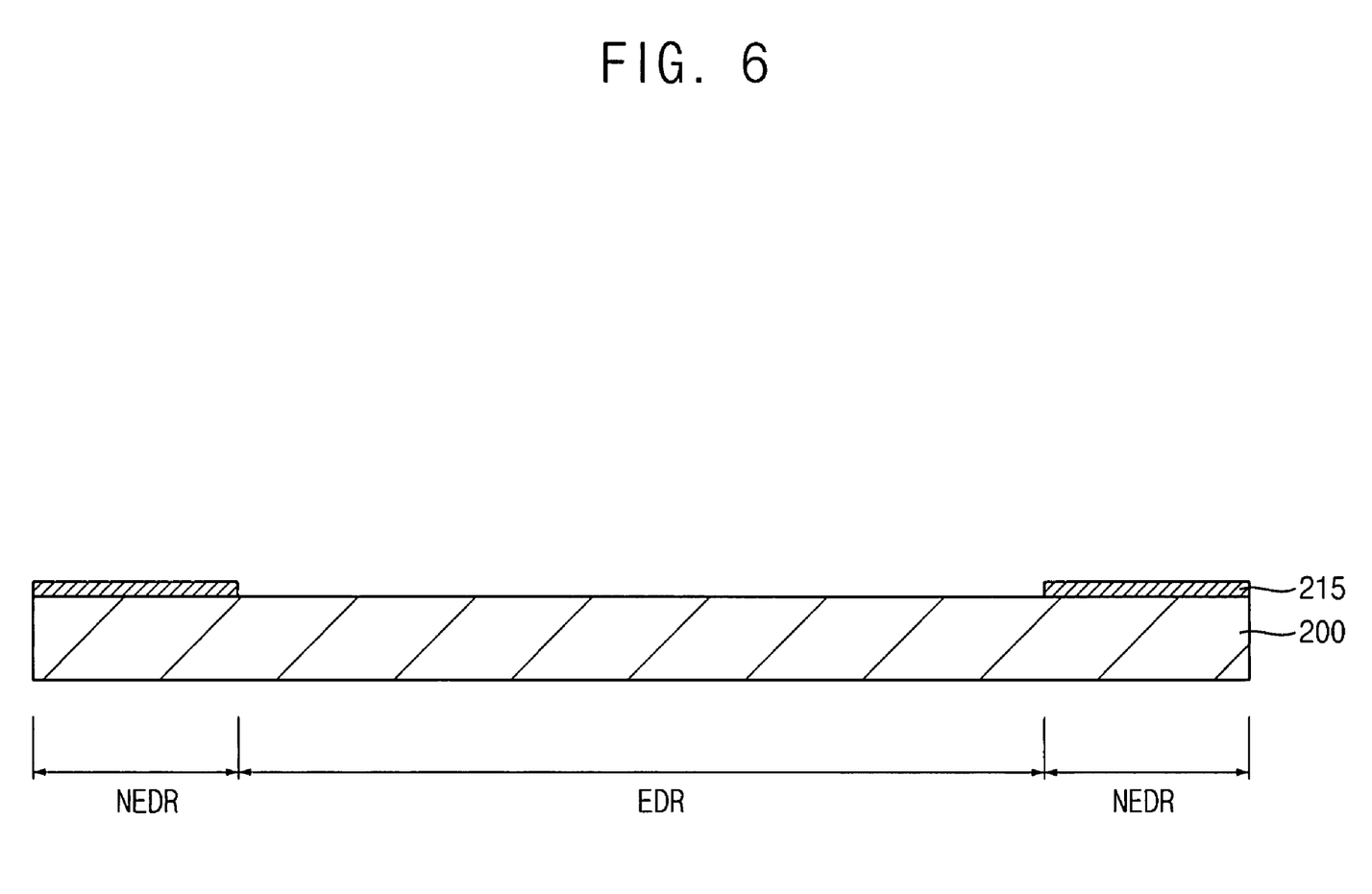
FIG. 6 is a cross-sectional view showing a first capacitor electrode on the substrate shown in FIG. 5.

FIG. 6 is a cross-sectional view showing a first capacitor electrode 215 on the substrate shown in FIG. 5.

Referring to FIGS. 5 and 6, metal layer 210 on substrate 200 is patterned to form a first capacitor electrode 215, using a photolithography process.

In particular, the metal layer 210 is cleaned, and a photoresist layer is coated on the metal layer 210. The photoresist layer is exposed and developed to form a photoresist pattern, which acts as an etch mask. The metal layer 210 is partially etched according to the photoresist pattern to form the first capacitor electrode 215 on the substrate 200.

The first capacitor electrode 215 may be formed in the non-effective display region NEDR. The first capacitor electrode 215, a dielectric layer, and a second capacitor electrode form a capacitor to store an electric charge. In addition, the first capacitor electrode 215 may block light that leaks from one or more pixels of the substrate 200, so that the first capacitor electrode 215 may function as an edge black matrix of an LCD device.

Figure 7:
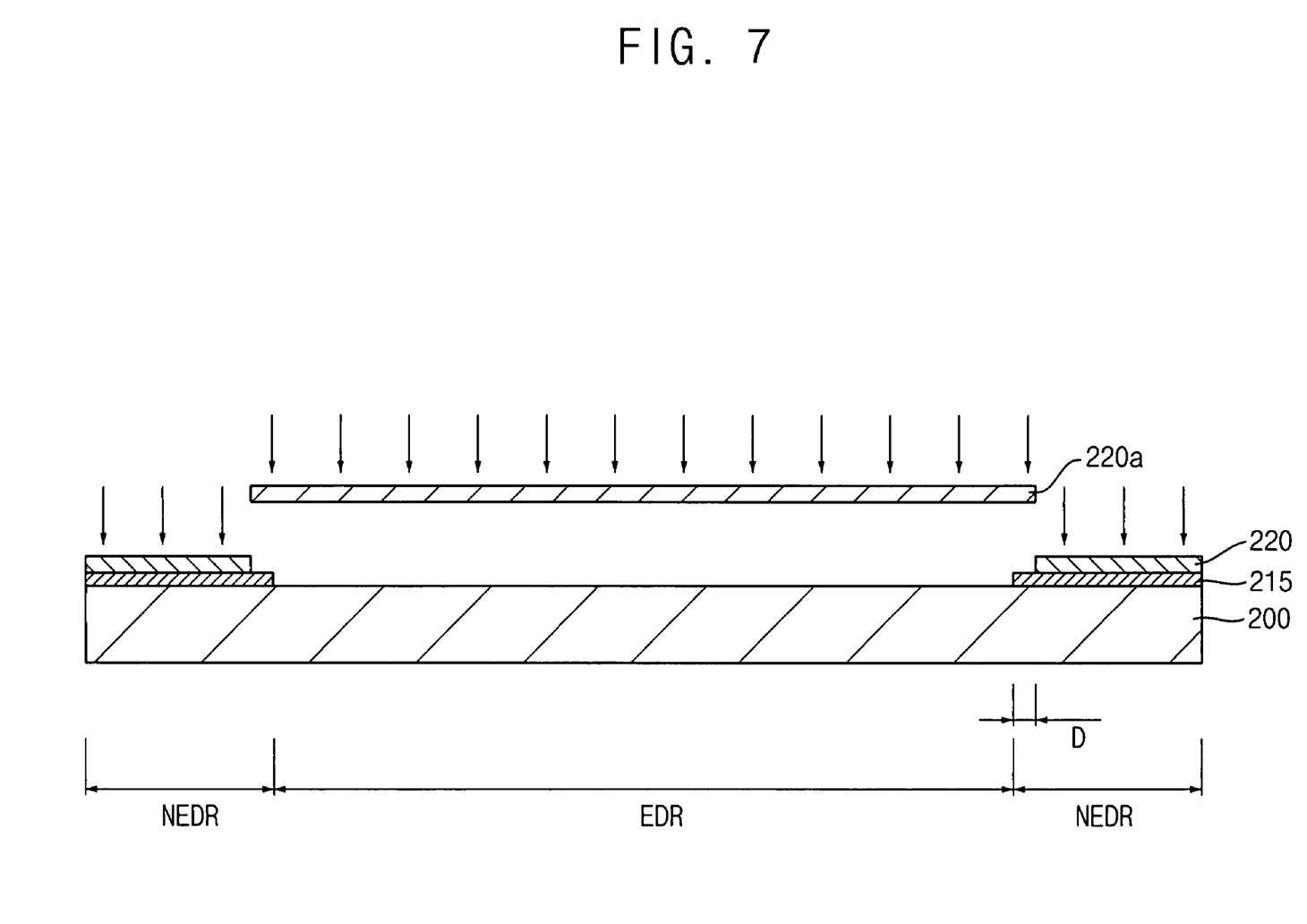
FIG. 7 is a cross-sectional view showing a dielectric layer such as an organic layer on the first capacitor electrode shown in FIG. 6.

FIG. 7 is a cross-sectional view showing a dielectric layer such as an organic layer on the first capacitor electrode shown in FIG. 6.

Referring to FIG. 7, a shadow mask 220a is aligned on the effective display region EDR. The shadow mask 220a has substantially the same shape and size as the effective display region EDR. Alternatively, the shadow mask 220a may have a larger size than the effective display region EDR.

A dielectric layer 220 is deposited on the first capacitor electrode 215 through the shadow mask 220a to form the dielectric layer 220. Examples of dielectric materials that can be used for the dielectric layer 220 include silicon oxide, silicon nitride, etc.

Alternatively, the dielectric layer 220 may be formed through a deposition process and a photolithography process.

That is, a dielectric thin film may first be formed in the effective display region EDR and the non-effective display region NEDR of the substrate 200 having the first capacitor electrode 215 using a spin coating process, a slit coating process, a chemical vapor deposition process, a sputtering process, etc.

A photoresist pattern (not shown) is formed on the dielectric thin film corresponding to the first capacitor electrode 215.

The dielectric thin film is partially etched using the photoresist pattern as an etching mask to etch the dielectric material in the effective display region EDR, leaving the dielectric layer 220 in the non-effective display region NEDR.

Alternatively, an organic layer (not shown) may be formed on an entire of the substrate 200 through a spin coating process, a slit coating, a sputtering process, etc. In the effective display region EDR, the organic layer may be used to provide the color filter, while in the non-effective display region NEDR, the organic layer may function as the dielectric layer for the capacitor described herein.

Figure 8:
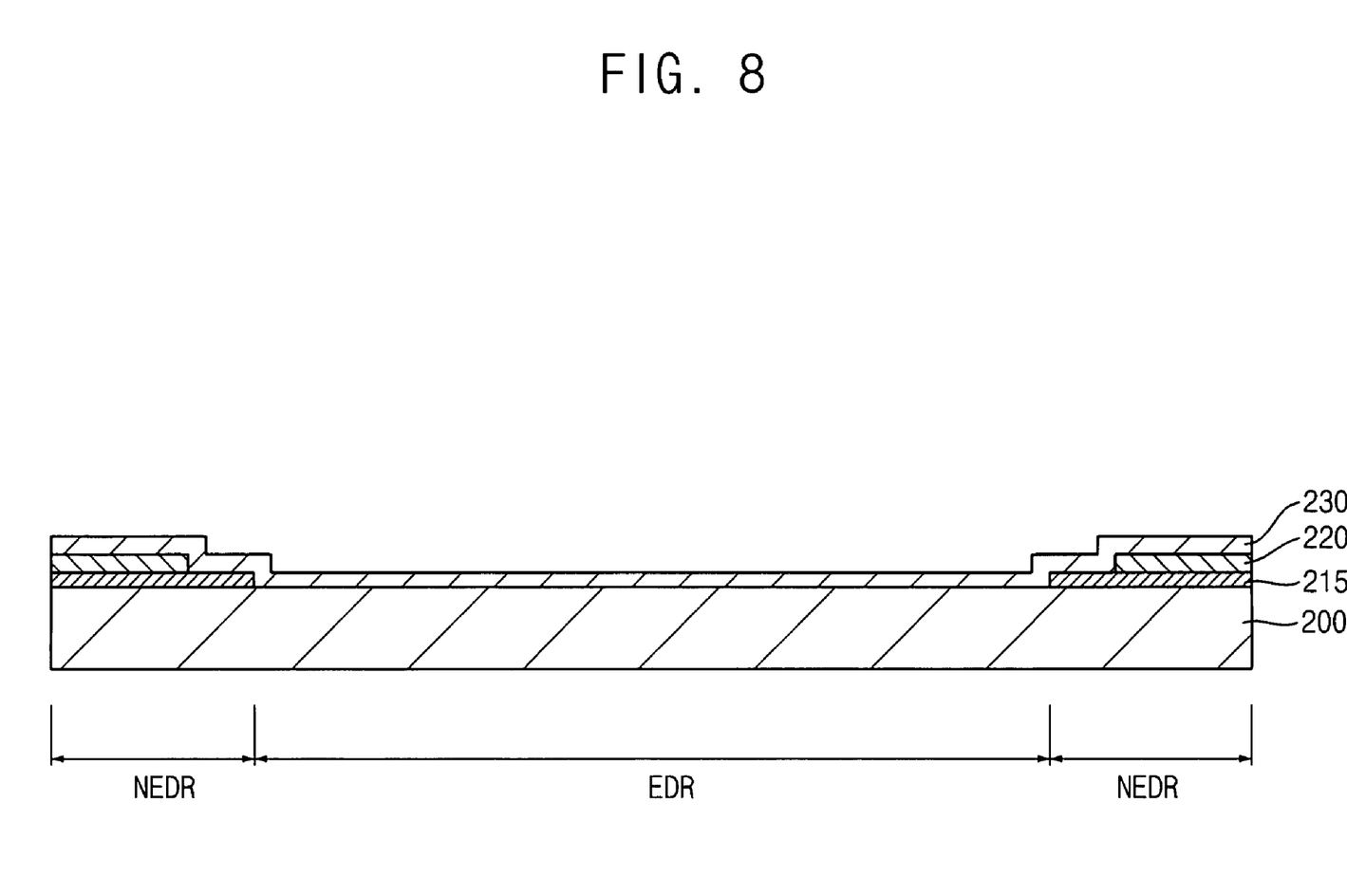
FIG. 8 is a cross-sectional view showing a transparent conductive thin film on the substrate shown in FIG. 7.

FIG. 8 is a cross-sectional view showing a transparent conductive thin film on the substrate shown in FIG. 7.

Referring to FIG. 8, a transparent conductive thin film 230 is formed in the effective display region EDR and the non-effective display region NEDR of the substrate through a chemical vapor deposition process, a sputtering process, etc. Examples of transparent conductive materials that can be used for the transparent conductive thin film 230 include indium tin oxide (ITO), indium zinc oxide (IZO), amorphous indium tin oxide, etc.

Figure 9:
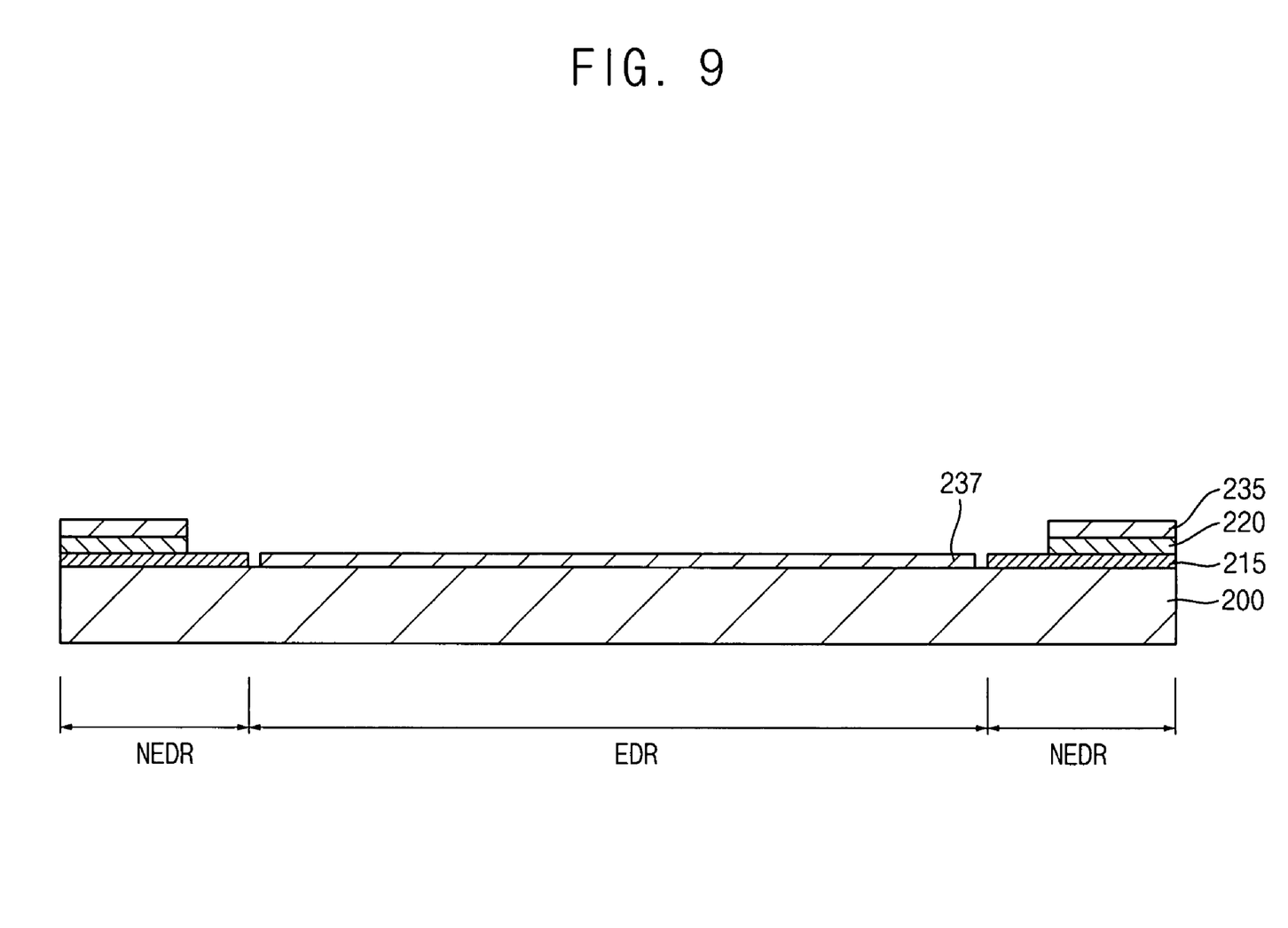
FIG. 9 is a cross-sectional view showing a second capacitor electrode and a transparent electrode by patterning the transparent conductive thin film shown in FIG. 8.

FIG. 9 is a cross-sectional view showing a second capacitor electrode and a transparent electrode formed by patterning the transparent conductive thin film shown in FIG. 8.

Referring to FIG. 9, a photoresist thin film (not shown) is formed on the substrate 200 having the transparent conductive thin film 230 through a spin coating process, a slit coating process, etc.

A pattern mask is aligned on the photoresist thin film (not shown), and the photoresist thin film (not shown) is exposed through the pattern mask. The photoresist thin film (not shown) is then developed to form a photoresist pattern (not shown) on the transparent conductive thin film 230. For example, the photoresist pattern (not shown) may be between the effective display region EDR and the non-effective display region NEDR.

The transparent conductive thin film 230 is etched through the photoresist pattern as an etching mask to form the second capacitor electrode 235 and a transparent electrode 237 in the non-effective display region NEDR and the effective display region EDR, respectively.

The second capacitor electrode 235 is spaced apart from the transparent electrode 237 by a predetermined distance. A protruded portion protrudes from the transparent electrode 237 in the effective display region EDR into the non-effective display region NEDR. In addition, a recessed portion is formed in the second capacitor electrode 235 corresponding to the protruded portion, and spaced apart from the protruded portion.

Figure 10:
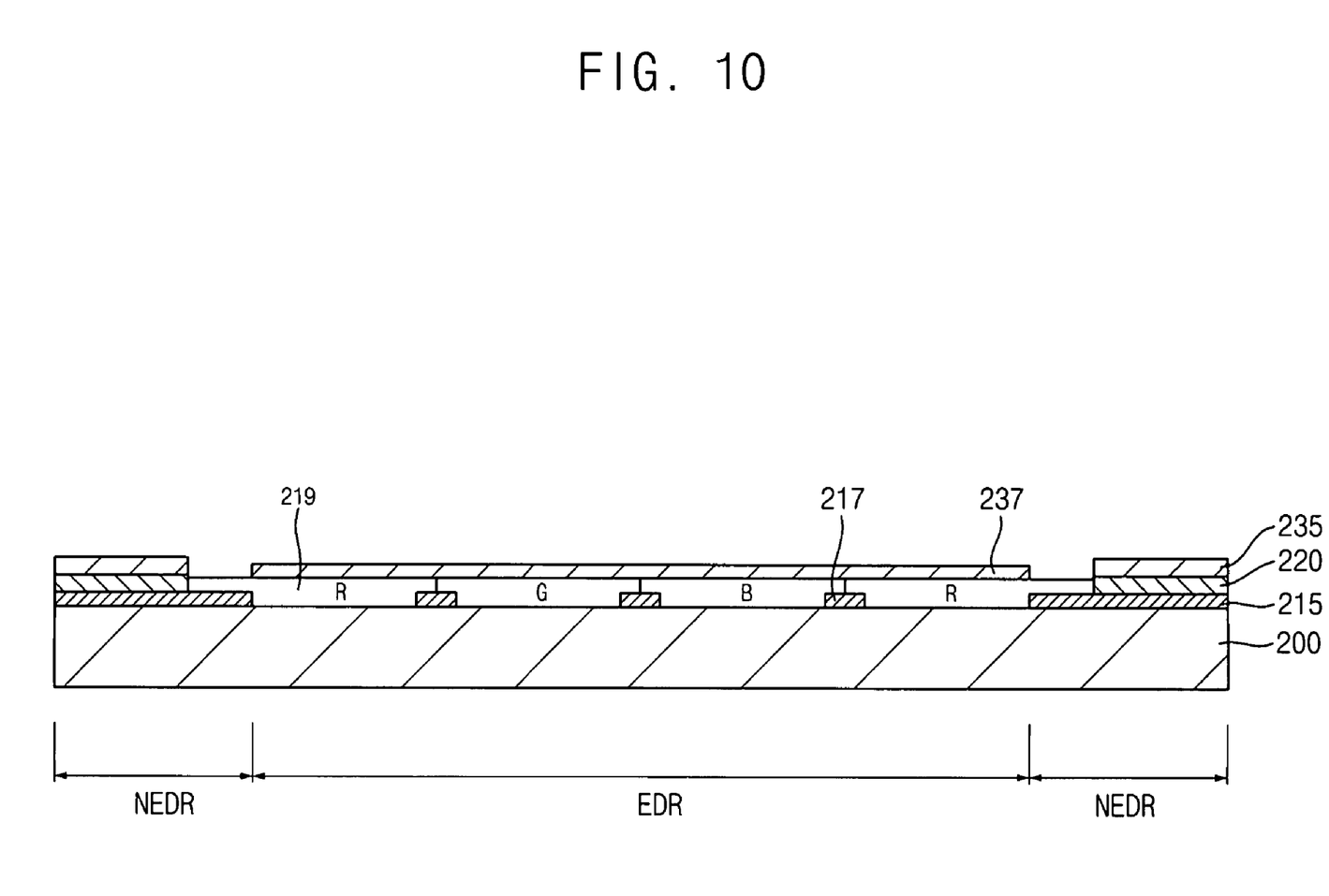
FIG. 10 is a cross-sectional view showing a method of manufacturing a display substrate in accordance with another embodiment of the present invention.

FIG. 10 is a cross-sectional view showing a method of manufacturing a display substrate in accordance with another embodiment of the present invention. Some of the method of manufacturing the display substrate of FIG. 10 is the same as in FIGS. 5 to 9. Thus, the same reference numerals will be used to refer to the same or like parts as those described in FIGS. 5 to 9 and any further explanations will be omitted.

Referring to FIG. 10, a black matrix pattern 217 may be formed from a same layer as a first capacitor electrode 215 that is in a non-effective display region NEDR. The black matrix pattern 217 is in an effective display region EDR, and has a matrix shape.

A color filter 219 is formed in the effective display region EDR. The color filter 219 corresponds to an opening of the black matrix pattern 217. The color filter 219 includes a red color filter, a green color filter and a blue color filter.

Display Device

Figure 11:
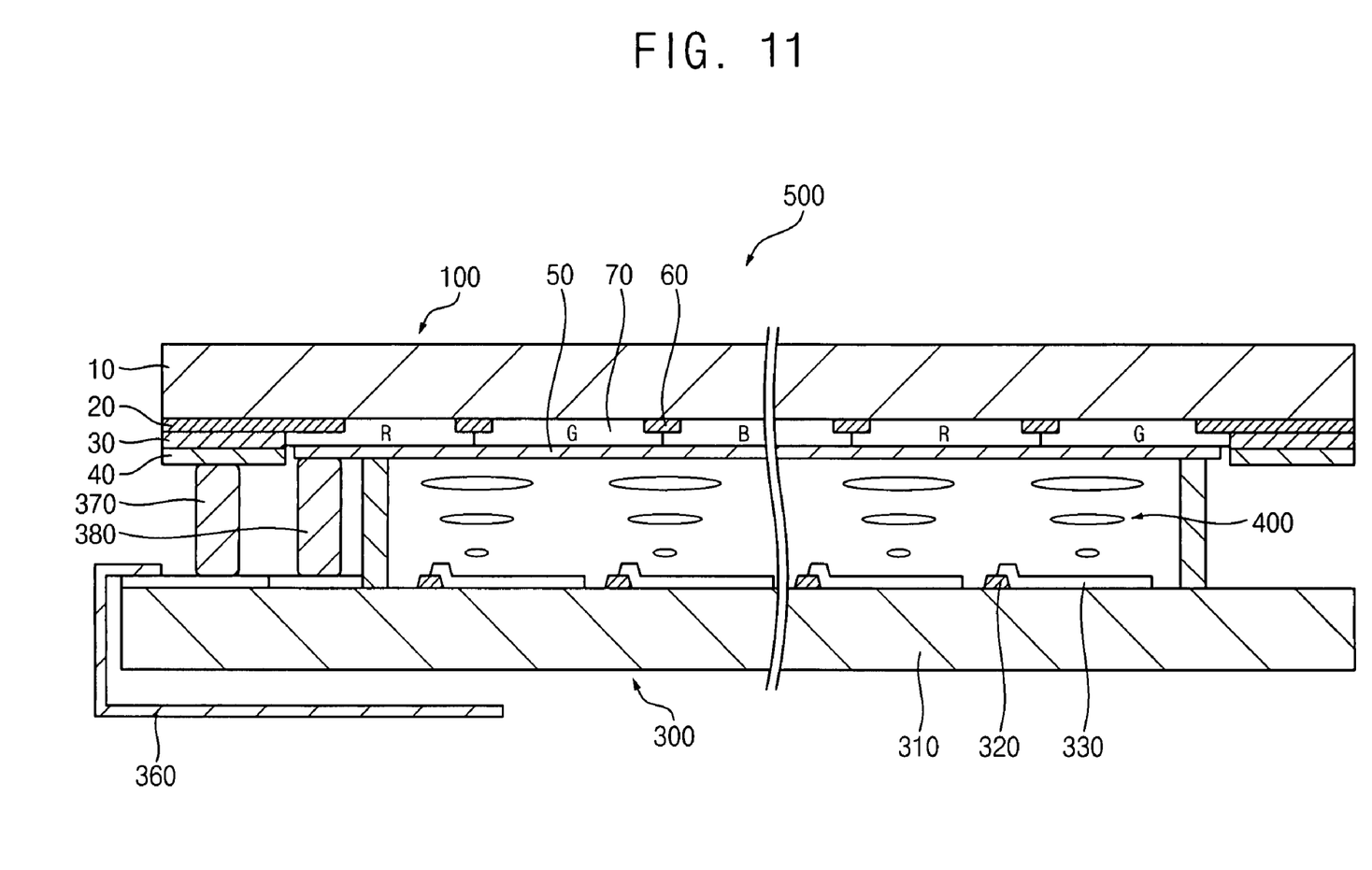
FIG. 11 is a cross-sectional view showing a display device in accordance with one embodiment of the present invention.

FIG. 11 is a cross-sectional view showing a display device in accordance with one embodiment of the present invention.

Referring to FIG. 11, the display device 500 includes a first display substrate 100, a second display substrate 300 and a liquid crystal layer 400.

The first display substrate 100 includes a substrate 10, a first capacitor electrode 20, a dielectric layer 30, a second capacitor electrode 40 and a common electrode 50. The first display substrate 100 may further include a black matrix pattern 60 and a color filter 70.

For example, the substrate 10 includes a transparent glass substrate. The substrate 10 may have a substantially quadrangular shape when viewed on a plane.

The substrate 10 includes an effective display region EDR and a non-effective display region NEDR. For example, the non-effective display region NEDR corresponds to a peripheral portion of the substrate 10, and has a band shape. The non-effective display region NEDR may be on the peripheral region of the substrate 10 and may have a closed loop shape. The non-effective display region NEDR substantially surrounds the effective display region EDR.

The first capacitor electrode 20 is on the substrate 10. The dielectric layer 30 is on the first capacitor electrode 20. The second capacitor electrode 40 is on the dielectric layer 30. The first capacitor electrode 20, the dielectric layer 30 and the second capacitor electrode 40 form a capacitor, and an electric charge is stored in the capacitor.

The first capacitor electrode 20 is in the non-effective display region NEDR of the substrate 10. For example, the first capacitor electrode 20 may be arranged along the non-effective display region NEDR. The first capacitor electrode 20 may have the closed loop shape that is substantially the same as the non-effective display region NEDR. The first capacitor electrode 20 may include a metal. Examples of metals that can be used for the first capacitor electrode 20 include chromium, chromium oxide, etc.

The dielectric layer 30 is on the first capacitor electrode 20. The dielectric layer 30 may include a dielectric material. Examples of dielectric materials that can be used for the dielectric layer 30 include silicon oxide, silicon nitride, etc. The dielectric layer 30 functions as a dielectric material that stores the electric charge that is applied through the first and second capacitor electrodes 20 and 40.

The second capacitor electrode 40 is on the dielectric layer 30, which may comprise an organic material. The second capacitor electrode 40 may include a transparent conductive material. Examples of transparent conductive materials that can be used for the second capacitor electrode 40 include indium tin oxide (ITO), indium zinc oxide (IZO), amorphous indium tin oxide (a-ITO), etc.

The common electrode 50 may be in the effective display region EDR. The common electrode 50 may include the transparent conductive material. Examples of transparent conductive materials that can be used for the common electrode 50 include indium tin oxide (ITO), indium zinc oxide (IZO), amorphous indium tin oxide (a-ITO), etc.

In operation, a driving signal for displaying an image is applied to the common electrode 50. A charging signal or a discharging signal is applied to the second capacitor electrode 40. The common electrode 50 is spaced apart from the second capacitor electrode 40.

The driving signal may be applied to the common electrode 50 through a conductive connector (not shown). However, when the conductive connector (not shown) is formed on the effective display region EDR, an opening rate and a luminance may be decreased and the image display quality of the display substrate may be compromised.

In FIG. 11, however, the common electrode 50 includes a protruded portion that protrudes from the effective display region EDR into the non-effective display region NEDR. The second capacitor electrode 40 that corresponds to the protruded portion may include a recessed portion that is spaced apart from the protruded portion when viewed on a plane.

A black matrix pattern 60 may be formed in the effective display region EDR of the display substrate 100 as a matrix shape. Examples of metals that can be used for the black matrix pattern 60 include chromium, chromium oxide, etc.

The black matrix pattern 60 may be formed from substantially the same layer as the first capacitor electrode 20. The charging and discharging signals are applied to the first capacitor electrode 20, and the black matrix 60 is spaced apart from the first capacitor electrode 20.

The color filter 70 is formed on the effective display region EDR of the substrate 10 that is exposed through openings of the black matrix pattern 60. For example, the color filter 70 may include a red color filter, a green color filter and a blue color filter.

An alignment layer (not shown) having a plurality of alignment grooves may be formed on the common electrode 50.

The second display substrate 300 includes a transparent substrate 310, a thin film transistor (TFT) 320 and a pixel electrode 330 that is electrically connected to a drain electrode (not shown) of the thin film transistor 320. The drain electrode (not shown) may be an output electrode of the thin film transistor 320.

In FIG. 11, a plurality of thin film transistors 320 is arranged on the transparent substrate 310 in a matrix shape. For example, when a resolution of the display device 500 is 1024×768, the number of the thin film transistors 320 is about 1024×768×3.

The pixel electrodes 330 of thin film transistors 320 correspond to the common electrode 50 of the first display substrate 100, and are electrically connected to the associated thin film transistors 320. A plurality of signal lines (not shown) is electrically connected to the thin film transistors 320.

A circuit board 360 is electrically connected to the second display substrate 300. The circuit board 360 applies a first driving signal to the signal lines (not shown), and applies a second driving signal and a third driving signal to the second capacitor electrode 40 of the first display substrate 100 and the common electrode 50, respectively.

A first conductive connector 370 is positioned between the second capacitor electrode 40 of the first display substrate 100 and the second display substrate 300 to transmit the second driving signal to the second capacitor electrode 40. In addition, a second conductive connector 380 is positioned between the common electrode 50 of the first display substrate 100 and the second display substrate 300 to transmit the third driving signal to the common electrode 50.

Each of the first and second conductive connectors 370 and 380 may include a synthetic resin body and a metal thin film on the synthetic resin body. Alternatively, each of the first and second conductive connectors 370 and 380 may include a metal body. Examples of metals that can be used for the first and second conductive connectors 370 and 380 include gold, silver, etc.

The second driving signal is applied from the second display substrate 300 to the second capacitor electrode 40 through the first conductive connector 370 so that an electric charge is stored between the first and second capacitor electrodes 20 and 40. The first and second capacitor electrodes 20 and 40 and the dielectric layer 30 form the capacitor. In addition, the stored electric charge may be discharged so that an electric charge is applied to the circuit board 360.

The liquid crystal layer 400 is interposed between the first and second display substrates 100 and 300. Liquid crystal molecules of the liquid crystal layer 400 vary their arrangement in response to an electric field applied between the pixel electrode 330 and the common electrode 50, so that the light transmittance of the liquid crystal layer 400 may be changed, thereby displaying an image.

In FIG. 11, the capacitor is formed on the first display substrate 100. Alternatively, the capacitor may be formed on the second display substrate 300.

According to embodiments of the present invention, the capacitor for the circuit board is formed on the display substrate so that the electric charge may be charged or discharged in the capacitor, thereby decreasing the number of the elements of the circuit board.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A display substrate comprising:
    a substrate including an effective display region and a non-effective display region that surrounds the effective display region;
    a first capacitor electrode positioned in the non-effective display region;
    a dielectric layer on the first capacitor electrode;
    a second capacitor electrode on the dielectric layer positioned corresponding to the first capacitor electrode;
    a transparent conductive electrode positioned substantially in the effective display region, and
    a color filter positioned in the effective display region.

2. The display substrate of claim 1, wherein the first capacitor electrode comprises at least one of a metal and a metal oxide.

3. The display substrate of claim 2, wherein the first capacitor electrode comprises at least one of chromium and chromium oxide.

4. The display substrate of claim 1, wherein the second capacitor electrode has a light transmittance substantially the same as a light transmittance of the transparent conductive electrode.

5. The display substrate of claim 4, wherein the second capacitor electrode comprises at least one material selected from the group consisting of indium tin oxide (ITO), indium zinc oxide (IZO) and amorphous indium tin oxide.

6. The display substrate of claim 1, wherein the dielectric layer is positioned substantially in the non-effective display region.

7. The display substrate of claim 1, wherein the dielectric layer includes a portion positioned in the effective display region and a portion positioned in the non-effective display region.

8. The display substrate of claim 1, wherein a black matrix pattern having a matrix shape is formed in the effective display region, and wherein the black matrix pattern is spaced apart from the first capacitor electrode.

9. The display substrate of claim 1, wherein the second capacitor electrode is spaced apart from the transparent electrode.

10. The display substrate of claim 9, wherein the transparent conductive electrode comprises a protruded portion that protrudes from the effective display region into the non-effective display region, and the second capacitor electrode includes a recessed portion that is spaced apart from the protruded portion.

11. The display substrate of claim 9, wherein the second capacitor electrode comprises a cut portion, and wherein a portion of the transparent conductive electrode extends toward the cut portion.

12. The display substrate of claim 1, wherein the dielectric layer comprises the color filter.

13. A display device comprising:
a first display substrate including:
a substrate including an effective display region and a non-effective display region that surrounds the effective display region;
a first capacitor electrode in the non-effective display region;
a dielectric layer on the first capacitor electrode;
a second capacitor electrode on the dielectric layer positioned corresponding to the first capacitor electrode; and
a transparent conductive electrode positioned substantially in the effective display region;
a second display substrate including:
a transparent substrate positioned corresponding to the substrate of the first display substrate;
a plurality of pixels on the transparent substrate, the pixels positioned corresponding to the transparent conductive electrode;
a first signal line electrically connected to the transparent conductive electrode of the first display substrate;
a second signal line electrically connected to the second capacitor electrode; and
a plurality of third signal lines configured to drive the pixels;
a liquid crystal layer interposed between the first and second display substrates; and
a circuit board electrically connected to the first signal line, the second signal line, and to third signal lines.

14. The display device of claim 13, wherein the transparent conductive electrode comprises a protruded portion that protrudes from the effective display region into the non-effective display region, and wherein the second capacitor electrode further comprises a recessed portion that is spaced apart from the protruded portion.

15. The display device of claim 13, further comprising:
a first conductive connector on the protruded portion, the first conductive connector electrically connected between the first signal line and the transparent conductive electrode; and
a second conductive connector electrically connected between the second signal line and the second capacitor electrode.

16. The display device of claim 13, wherein the circuit board comprises a flexible circuit board.

* * * * *